(12) United States Patent
Kim

(10) Patent No.: US 7,111,859 B2
(45) Date of Patent: Sep. 26, 2006

(54) MOVEABLE SIDE STEP FOR A VEHICLE

(76) Inventor: Moon-Kuen Kim, 102-708 Hyundai Glory Apt., Jungsan-dong, Buk-gu Ulsan (KR) 683-450

( * ) Notice: Subject to any disclaimer, the term of this patent is extended or adjusted under 35 U.S.C. 154(b) by 83 days.

(21) Appl. No.: 10/690,875

(22) Filed: Oct. 21, 2003

(65) Prior Publication Data

US 2004/0135339 A1    Jul. 15, 2004

(30) Foreign Application Priority Data

Oct. 21, 2002 (KR) .................. 10-2002-0064334

(51) Int. Cl.
*B60R 3/00* (2006.01)
(52) U.S. Cl. .................................. 280/166
(58) Field of Classification Search ............... 280/163, 280/164.1, 166, 406.2, 169; 296/75; 182/78, 182/79, 127; 108/99; 297/423.2, 423.26; 105/449, 437; 482/23, 30; 16/82; 312/334.1; 172/319; D12/162; 238/284; 188/268
See application file for complete search history.

(56) References Cited

U.S. PATENT DOCUMENTS

| | | | | |
|---|---|---|---|---|
| 2,670,968 A | * | 3/1954 | Duffy | 182/89 |
| 3,341,223 A | * | 9/1967 | Wampfler | 280/166 |
| 3,641,619 A | * | 2/1972 | Roylance | 182/15 |
| 3,671,058 A | * | 6/1972 | Kent | 280/166 |
| 3,771,815 A | * | 11/1973 | Bridges | 280/166 |
| 5,342,073 A | | 8/1994 | Poole | |
| 6,135,472 A | | 10/2000 | Wilson et al. | |
| 6,481,733 B1 | * | 11/2002 | Shellabarger | 280/163 |
| 6,612,596 B1 | * | 9/2003 | Jeon et al. | 280/166 |

FOREIGN PATENT DOCUMENTS

| | | |
|---|---|---|
| DE | 1220276 B | 6/1966 |
| EP | 0118923 A | 9/1984 |
| EP | 03256621.8-2421 | 2/2004 |
| FR | 2738197 A | 3/1997 |
| JP | 59230841 A | 12/1984 |

OTHER PUBLICATIONS

JP Patent Abstract, May, 11, 1985, Patent Abstrats of Japan, vol. 9, #107 (M-378).

* cited by examiner

*Primary Examiner*—Christopher P. Ellis
*Assistant Examiner*—Vaughn Coolman
(74) *Attorney, Agent, or Firm*—Rutan & Tucker, LLP

(57) ABSTRACT

The movable side step comprises a front frame and a rear frame being connected to a body frame of the lower portion of the vehicle, a guide bar and foothold being connected movably forward and backward to the front frame and the rear frame, and an rotating link and operating member and door connecting rod for operating guide bar and foothold according to the opening/shutting of a door of the vehicle. According to the movable side step, the vehicle may be driven more safely.

8 Claims, 11 Drawing Sheets

MOVEABLE SIDE STEP FOR A VEHICLE

TECHNICAL FIELD

The present invention relates to a side step, and more particularly to a movable side step for a vehicle, enabling it to be automatically moved forward and backward according to the opening/shutting of a side door of a vehicle.

BACKGROUND ART

Generally, the bottom surface of commercial vehicles or recreational vehicles, which many passengers get into, is higher than that of passenger cars. Accordingly, it is difficult for people such as children or the old and the weak to get into or get out of the vehicles. To solve this problem, as an auxiliary foothold, a side step is installed onto the lower portion of the side door of the commercial vehicle or the recreational vehicle in order to protrude outward from the side door thereof.

A sample of a conventional vehicle equipped with the side step is shown in FIG. 12. The conventional vehicle, generally, comprises the frame 110 made of metal pipe and formed with vertical bending portions 101 and 102 on both sides thereof, and a rectangular foothold 120 being protrudingly outwardly mounted on the one side of the frame 110.

A predetermined bracket is fixedly attached on the body frame or the inner side member installed on the lower surface of the vehicle, and the bending portions 101 and 102 of the frame 110 are connected to the bracket by a connecting means such as a bolt. Thereby, the side step 100 is installed on the vehicle.

At this rime, the foothold 120 of the side step 100 is positioned in the intermediate of between the bottom surface of the vehicle and the ground so that passengers can easily get into or get out of.

However, the conventional side step should be fixedly outwardly protruding from the side door of the vehicle. Therefore, when the side step is excessively protruding, a car accident may happen. And, when the vehicle is parked, a large parking space is required. Further, when the side step is insufficiently protruding, it may not be usefully used as a foothold.

DISCLOSURE OF INVENTION

Therefore, the present invention has been developed to solve the above-mentioned problems. It is an object of the present invention to provide a movable side step in which it can be moved forward and backward from the lower surface of a side door of a vehicle according to the opening/shutting of the door and thereby passengers may get into and out of the vehicle easily. Further, when the vehicle is driven, since the side step does not protrude out of the vehicle, it may be prevented from car accidents and thereby driving safety may be improved.

To accomplish the object of the present invention, the present invention provides a movable side step for a vehicle comprising: a fixing means being connected to a body frame of the lower portion of the vehicle; a stepping means being connected to the fixing means enabling it to be moved forward and backward; and an operating means for operating the stepping means according to the opening/shutting of a door of the vehicle.

In the movable side step, the fixing means comprises a front frame and a rear frame being arranged with a predetermined distance, wherein each of the front frame and the rear frame is provided with an upper roller and a lower roller in order to help the moving of the stepping means.

Further, the front frame and rear frame further comprises an elastic member being mounted on the upper portion of the upper roller of the front frame and on the lower portion of the lower roller of the rear frame in order to relieve an outer force being applied to the stepping means.

Further, the stepping means comprises a guide bar being interposed between the upper roller and lower roller of the front frame and rear frame, and a foothold being connected to the front of the guide bar.

Further, the front frame and rear frame comprises an elastic member being mounted on the upper portion of the upper roller of the front frame and on the lower portion of the lower roller of the rear frame in order to relieve an outer force being applied to the guide bar and the foothold.

Further, the operating means comprises a rotating link being rotatably connected to the fixing means, a door connecting rod being fixedly connected to one end of the rotating link, and a operating member being rotatably connected to the other end of the rotating link and connecting to the stepping means.

Further, the operating member comprises an operating rod being fixedly connected to the stepping means, an operating rod bracket being rotatably connected to the rotating link and being movably connected to the operating rod, and an elastic member covering the operating rod and being blocked to be moved by the operating rod bracket.

Further, the operating means further comprises a door connecting bracket being fixedly connected to the door and being rotatably connected to the door connecting rod.

The present invention provides a movable side step for a vehicle comprising: a fixing frame being connected to a body frame of the lower portion of the vehicle; a connecting frame for fixedly connecting said fixing frame; a guide bar being connected to the fixing frame enabling to be moved forward and backward; a foothold being connected to the front of the guide bar; a rotating link rotatably connected to the intermediate of the connecting frame with a predetermined distance; an operating member having one end being roratably connected to one end of the rotating link and the other end being connected to the foothold; a door connecting rod being fixedly connected to the other end of the rotating link; and a door connecting bracket being rotatably connected to the door connecting rod and being fixedly connected to the door.

In the movable side step, the fixing frame comprises a front frame and a rear frame, wherein the front frame and rear frame are fixedly connected to each other by a supporting member.

Further, each of the front frame and the rear frame comprises an upper roller and a lower roller in order to help the moving of the guide bar.

Further, the front frame and rear frame further comprises an elastic member being mounted on the upper portion of the upper roller of the front frame and on the lower portion of the lower roller of the rear frame in order to relieve an outer force being applied to the guide bar and the foothold.

Further, the operating member comprises an operating rod being fixedly connected to the foothold, an operating rod bracket being rotatably connected to the rotating link and being movably connected to the operating rod, and an elastic member covering the operating rod and being blocked to be moved by the operating rod bracket.

The present invention provides a movable side step for a vehicle comprising: two front frames and two rear frames being connected to a body frame of the lower portion of the vehicle; a supporting member for fixedly connecting the front frame and the rear frame; a connecting member for fixedly connecting two rear frame each other; a guide bar being connected movably forward and backward to the front frame and rear frame; a foothold being connected to the front of the guide bar; an upper roller and a lower roller being installed on the front frame and the rear frame to contact the upper and lower portion of the guide bar in order to help the moving of the guide bar; an elastic member being installed on the upper portion of the upper roller of the front frame and the lower portion of the lower roller of the rear frame in order to relieve the outer force being applied to the guide bar and the foothold; a rotating link being rotatably connected to the intermediate of the connecting frame with a predetermined distance; an operating rod being fixedly connected to the foothold; an operating rod bracket being rotatably connected to one end of the rotating link and being movably connected to the operating rod; an elastic member covering the operating rod and being blocked to be moved by the operating rod bracket; a door connecting rod being fixedly connected to the other end of the rotating link; and a door connecting bracket being rotatably connected to the door connecting rod and being fixedly connected to the door.

BRIEF DESCRIPTION OF DRAWINGS

Other features and advantages of the present invention will become more apparent from the following description taken in connection with the accompanying drawings, wherein.

DESCRIPTION OF THE PREFERRED EMBODIMENT(S)

Hereinafter, the movable side step for a vehicle according to the preferred embodiments of the present invention will be explained in detail referring to the accompanying drawings.

Figure 1:
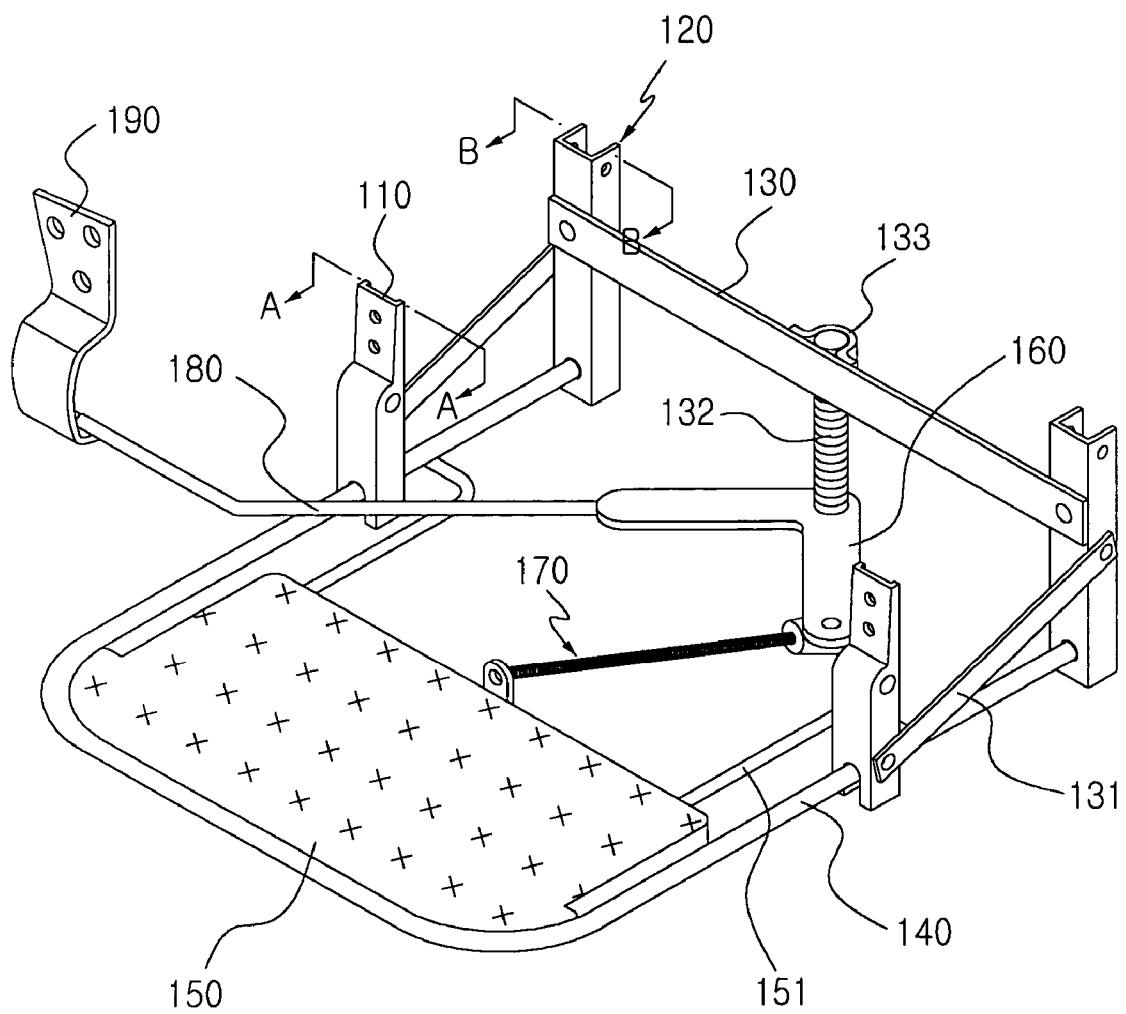
FIG. 1 is a schematic overall perspective view of the movable side step for a vehicle according to the preferred embodiment of the present invention.

The schematic perspective view of the movable side step for a vehicle according to the preferred embodiment of the present invention is shown in FIG. 1.

Two front frames 110 and two rear frames 120, arranged with a predetermined distance, are disposed with a predetermined distance. Further, the front frame 110 and the rear frame 120 are fixedly connected to each other by the supporting member 131. Further, the front frame 110 and the rear frame 120 are connected to a predetermined position of the body frame or the side member installed on the lower portion of the vehicle by the first fixing bracket 210 and the second fixing bracket 220 shown in FIGS. 2 and 3.

The guide bar 140 movably passes through the end portions of the front frame 110 and the rear frame 120. The front frame 110 and the rear frame 120 having the above-described structure will be explained in detail later referring to FIGS. 4 to 7.

The guide bar 140 is a "⊏" type, and the foothold 150 is installed on the front portion thereof. Further, the lower surface of the foothold 150 is supported by the foothold fixing rod 151 being fixedly connected to the guide bar 140.

The slip preventive member such as a rubber plate is attached on the upper surface of the foothold 150 in order that passengers are prevented from being slipped.

Two rear frames 120 are connected to each other by the connecting frame 130.

With fixing shaft supporting plate 133, the fixing shaft 132 is fixedly connected to the intermediate of the rear surface of the connecting frame 130 by means of welding, etc.

The "⌐" type rotating link 160 is rotatably connected to the end of the fixing shaft 132.

One end of the rotating link 160 is connected to the door connecting rod 180 being connected to the door (not shown) of the vehicle, and the other end of the rotating link 160 is rotatably connected to the operating member 170 being fixedly connected to the foothold 150.

The rotating link 160 and the operating member 170 will be explained in detail later referring to FIGS. 8 and 9.

The door connecting rod 180 is rotatably connected to the lower portion of the door connecting bracket 190 being connected to the door of the vehicle by a connecting member such as bolt.

It is preferable that the door connecting bracket 190 is not protruded outwardly from door when it is connected to the door.

In the above-described parts, the structure of the front frame 110, the rear frame 120 and the guide bar 140 may be changed according to the structure of the body frame of the vehicle and the position of the door.

Figure 2:
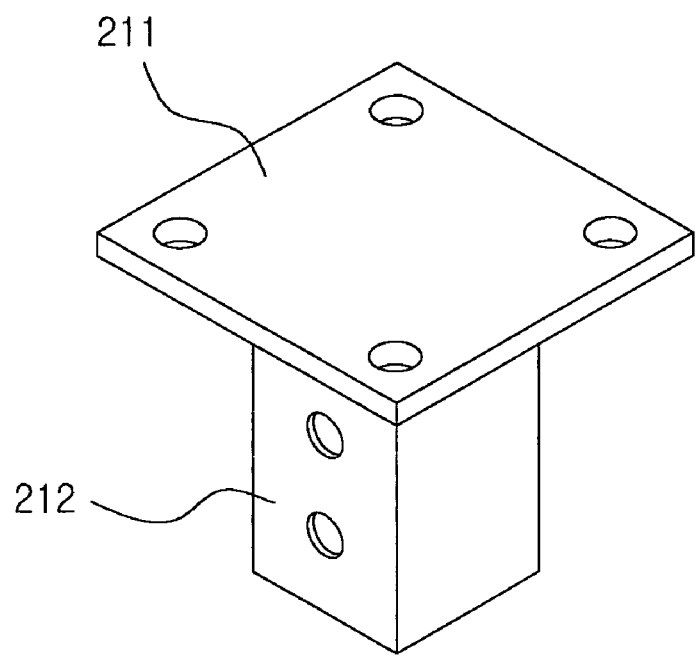
FIGS. 2 and 3 are fixing brackets being used to connect the side step in FIG. 1 to a body frame or side member installed on the lower portion of the vehicle.
Figure 3:
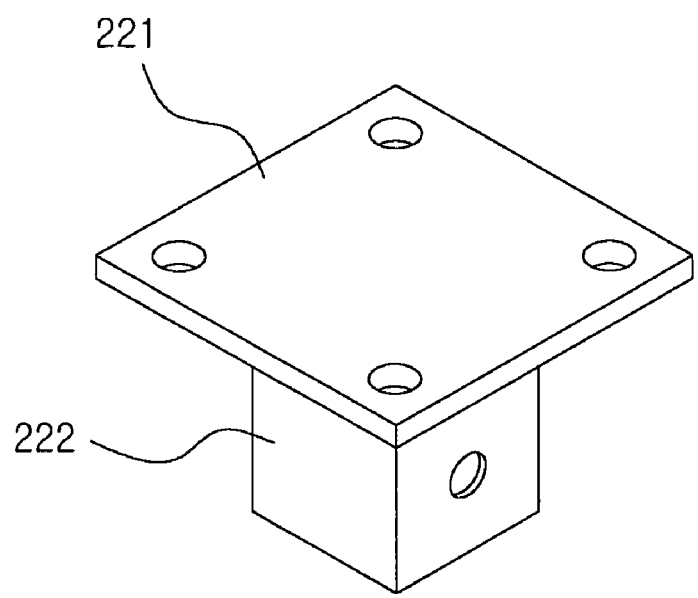

The first fixing bracket 210 and the second fixing bracket 220, being used to connect the front frame 110 and the rear frame 120 to the body frame or the side member installed on the lower portion of the vehicle, are shown in FIGS. 2 and 3.

The first fixing bracket 210 has a plate type first body frame connecting portion 211 and a first frame connecting portion 212 being integrally formed thereon.

The body frame connecting portion 211 is fixedly connected to the body frame by means of welding or by a connecting member such as a bolt. A through hole corresponding with the through hole formed on the front frame 110 is formed on the first frame connecting portion 212, thereby the front frame 110 may be detachably connected to the first frame connecting portion 212.

The second fixing bracket 220 has a plate type second body frame connecting portion 221 and a second frame connecting portion 222 being integrally formed thereon.

The second body frame connecting portion 221 is fixedly connected to the body frame by means of welding or by a connecting body such as bolt. A through hole corresponding with the through hole formed on the rear frame 120 is formed on the second frame connecting portion 222, thereby the rear frame 120 is detachably connected to the second frame connecting portion 222.

Figure 4:
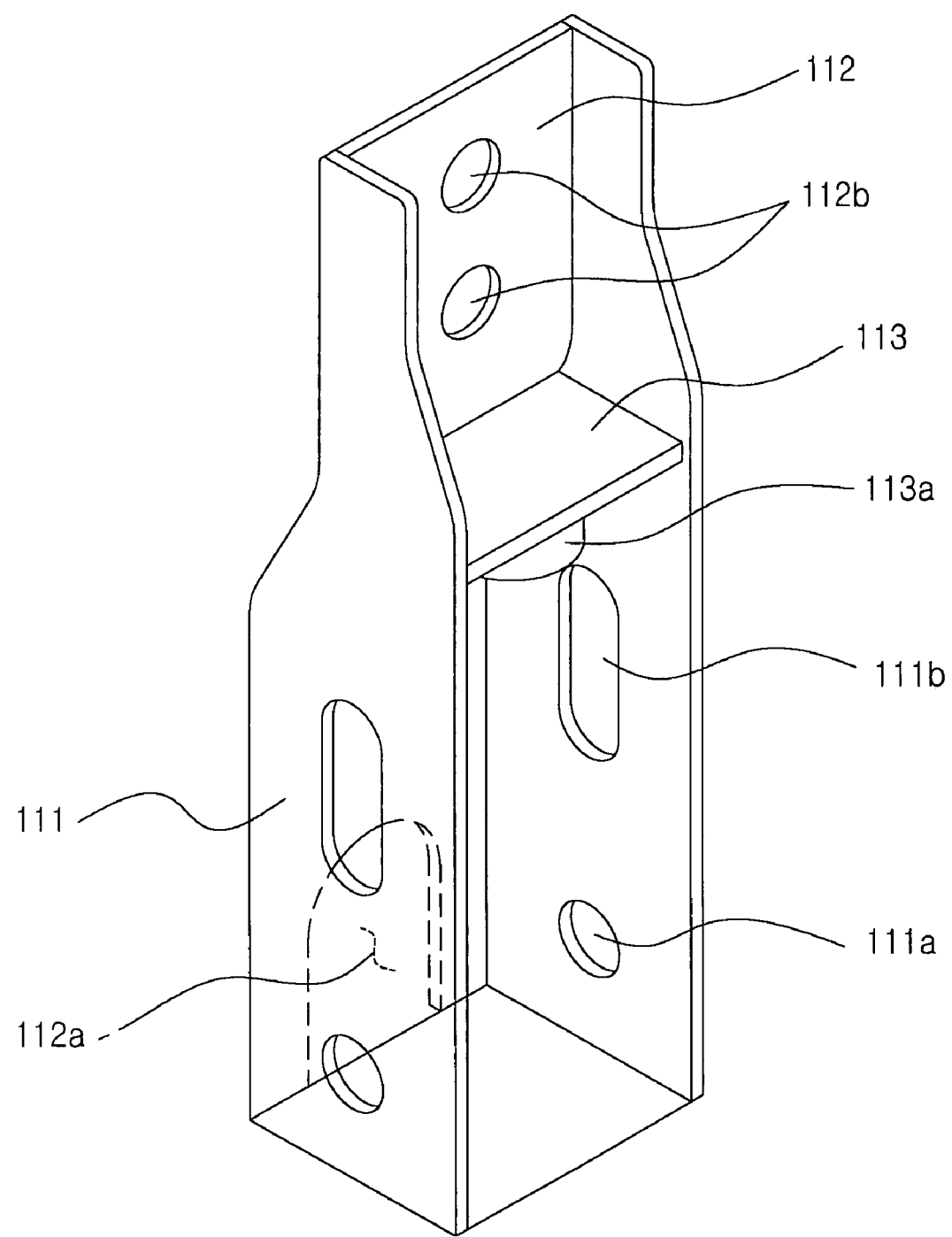
FIG. 4 is a schematic rear perspective view of the front frame of the side step in FIG. 1.
Figure 5:
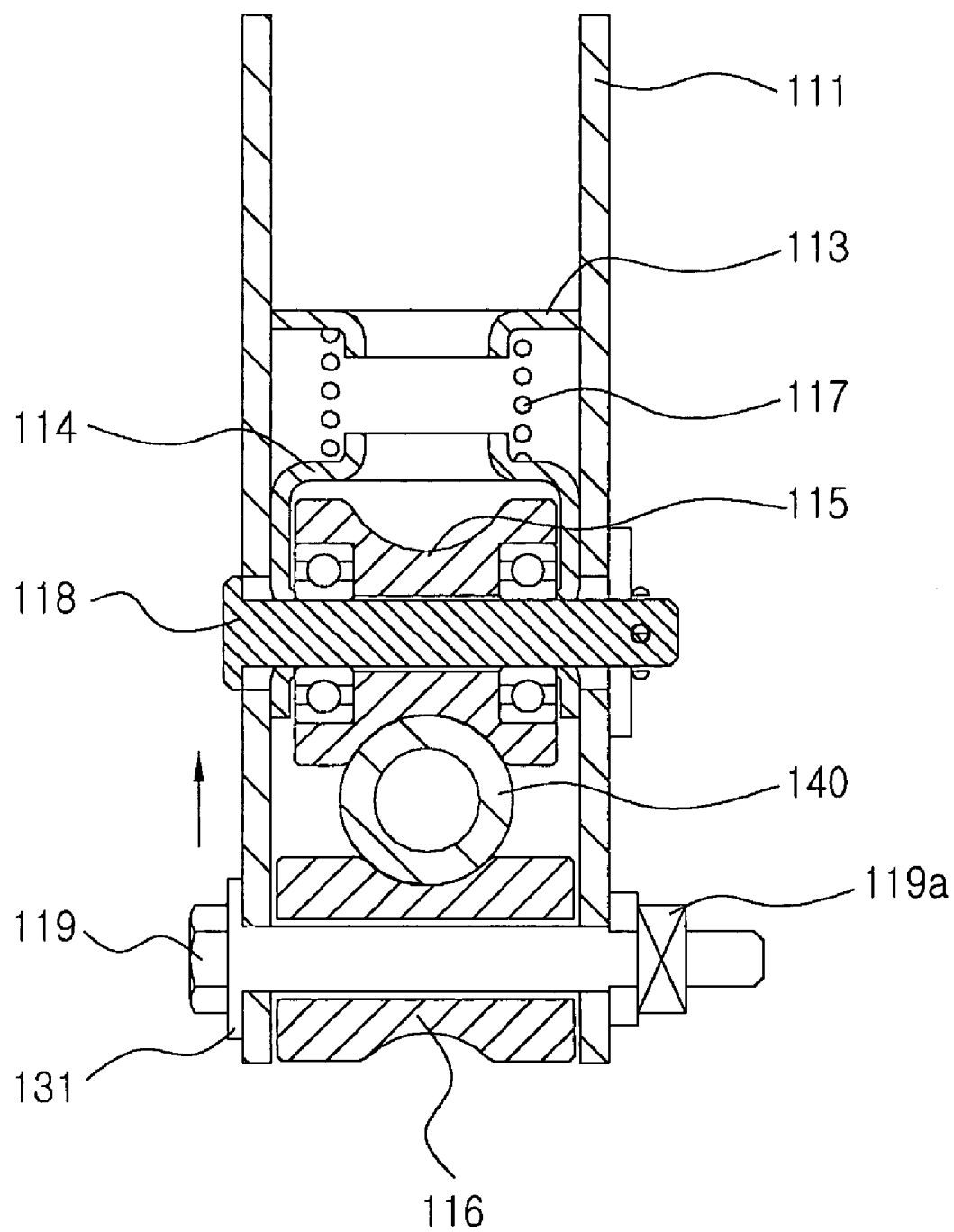
FIG. 5 is a sectional view obtained according to line A—A in FIG. 1.

Next, referring to FIGS. 4 and 5, the front frame 110 will be explained in detail.

The body of the front frame has two first vertical portions 111 separated with a predetermined distance and the first connecting portion 112 for connecting one side of the vertical portion 111.

The first through hole 111a and the second through hole 111b are formed on each first vertical portion 111, and the guide bar through opening 112a and two third through holes 112b are formed on the first connecting opening 112.

Further, the first fixing spring supporting portion 113 is fixedly provided near the first vertical portion 111 in order to connect to the first connecting portion 112, and the first spring inserting portion 113a is protrudingly formed on the first fixing spring supporting portion 113.

The first upper roller 115 and the first lower roller 116 are provided on the front frame 110 in order to help the moving of the guide bar 140.

The first upper roller 115 is mounted on the front frame 110 in a condition in which it is inserted in the first movable spring supporting portion 114. And, the roller 115 is rotatably connected to the front frame 110 by the first upper bolt 118 passing through the second through hole 111b formed on the first vertical portion 111.

At this time, as an elastic member, the first spring 117 is interposed between the first movable spring supporting portion 114 and the first fixing spring supporting portion 113.

The length of the second through hole 111b is more than twice times of the diameter of the first upper bolt 118. Accordingly, when an outer force is applied to the guide bar 140 in the direction of the arrow, the first upper roller 115 and the first movable spring supporting portion 114, which are connected by the first upper bolt 118, are moved in the direction of the arrow. Further, during this time, the first movable spring supporting portion 114 is blocked to be moved by the first spring 117, thereby the outer force applied to the guide bar 140 is gone.

The first lower roller 116 is rotatably connected to the front frame 110 by the first lower bolt 119, and the first lower bolt 119 is connected to the first vertical portion 111 by a fastening member such as a nut 119a.

At this time, the first upper roller 115, the guide bar 140 and the first lower roller 116 are preferably connected to be in contact with each other.

The supporting member 131 is connected between the first lower bolt 119 and the outer surface of the first vertical portion 111.

In the structure of the above-described front frame 110, the first upper bolt 118 and the first lower bolt 119 are detachable, therefore, if necessary, the first upper roller 115 and the first lower roller 116 may be easily changed.

Figure 6:
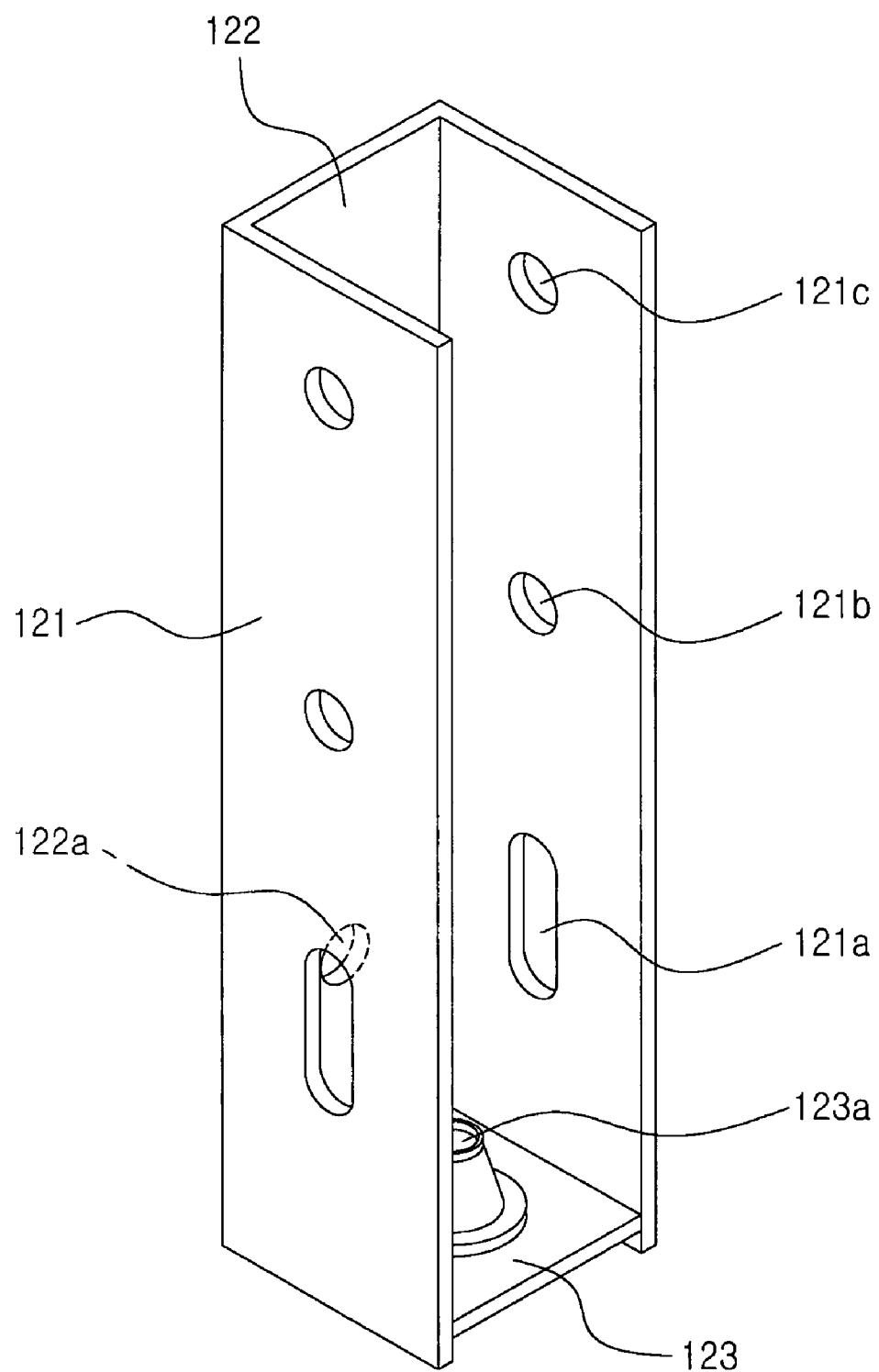
FIG. 6 is a schematic rear perspective view of the rear frame of the side step in FIG. 1.
Figure 7:
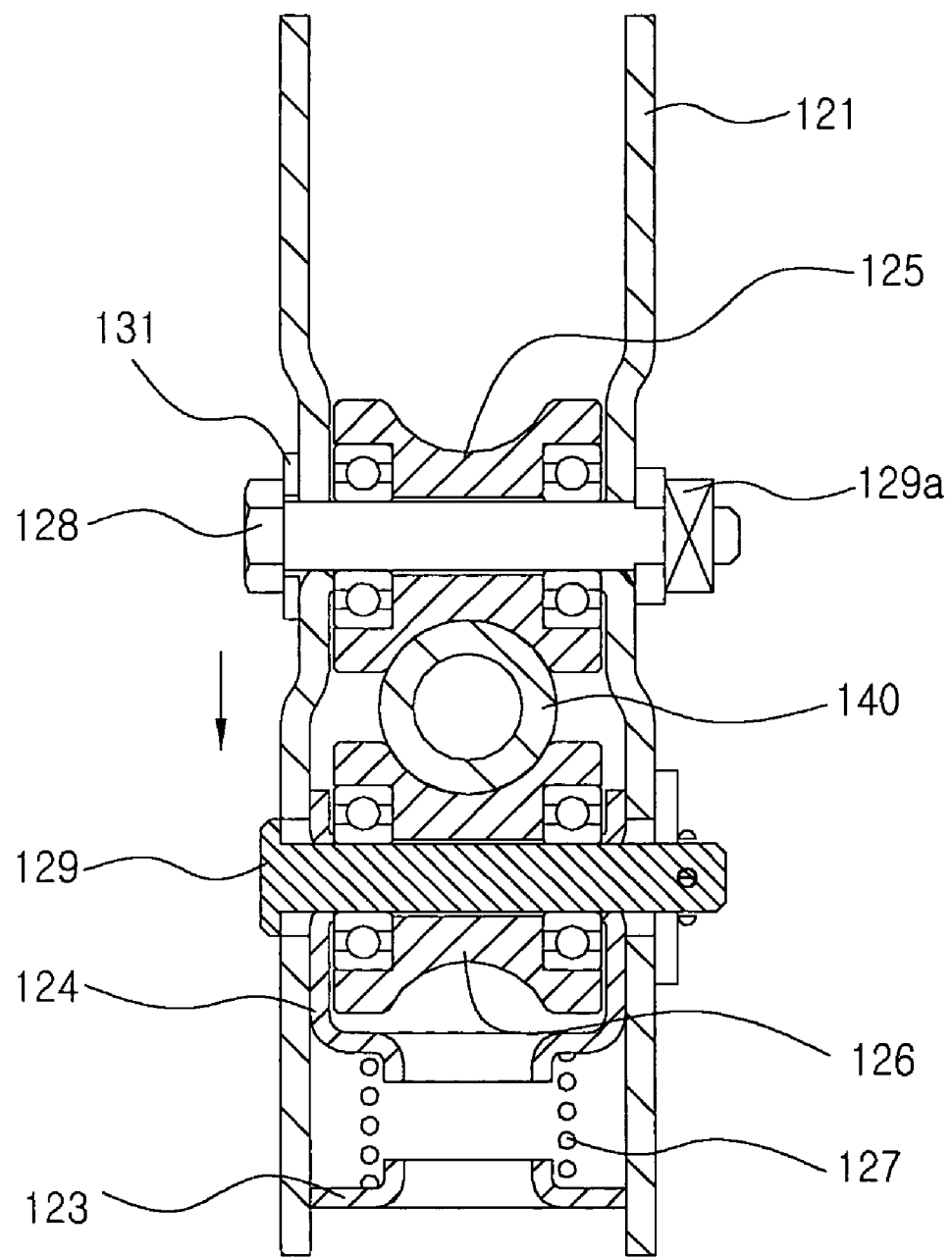
FIG. 7 is a sectional view obtained according to line B—B in FIG. 1.

Next, the rear frame 120 will be explained in detail referring to FIGS. 6 and 7.

The body of the rear frame 120 has two second vertical portions 121 with a predetermined distance and the second connecting portion 122 for connecting one side of the second vertical portion 121.

The fourth to sixth through holes 121a, 121b and 121c are formed on each second vertical portion 121, and the guide bar through hole 122a is formed on the second connecting portion 122.

Further, the second fixing spring supporting portion 123 is fixedly installed on the end of the second vertical portion 121 to be connected to the second connecting portion 122. And, the second spring inserting portion 123a is protrudingly formed on the second fixing spring supporting portion 123.

The second upper roller 125 and the second lower roller 126 are provided in the rear frame 120 to help the moving of the guide bar 140.

The second upper roller 125 is rotatably connected to the rear frame 120 by the second upper bolt 128, and the second upper bolt 128 is connected to the second vertical portion 121 by a fastening member such as a nut 129a.

Further, the supporting member 131 is connected between the second upper bolt 128 and the outer surface of the second vertical portion 121.

The second lower roller 125 is mounted on the rear frame 120 in a condition in which it is inserted in the second movable spring supporting portion 124. And, the lower roller 125 is rotatably connected to the rear frame 120 by the second lower bolt 129 passing through the fourth through hole 121a formed on the second vertical portion 121. Further, the second lower bolt 129 is connected to the second vertical bar 121 by a fastening member such as a pin.

At this time, as an elastic member, the second spring 127 is interposed between the second movable spring supporting portion 124 and the second fixing spring supporting portion 123.

The fourth trough hole 121a is the substantially same size as the second through hole 111b of the front frame 110. Accordingly, when an outer force is applied to the guide bar 140 in the arrow direction, the second lower roller 126 and the second movable spring supporting portion 124, which are connected by the second lower bolt 129, is moved in direction of the arrow. Further, the second movable spring supporting portion 124 is blocked to be moved by the second spring 127. Thereby, the outer force applied to the guide bars 140 is gone.

At this time, the second upper roller 125, the guide bar 140, and the second lower roller 126 are preferably connected to be in contact with each other.

In the above-described rear frame 120, the second upper bolt 128 and the second lower bolt 129 are detachable, therefore the second upper roller 125 and the second lower roller 126 may easily be changed.

Figure 8:
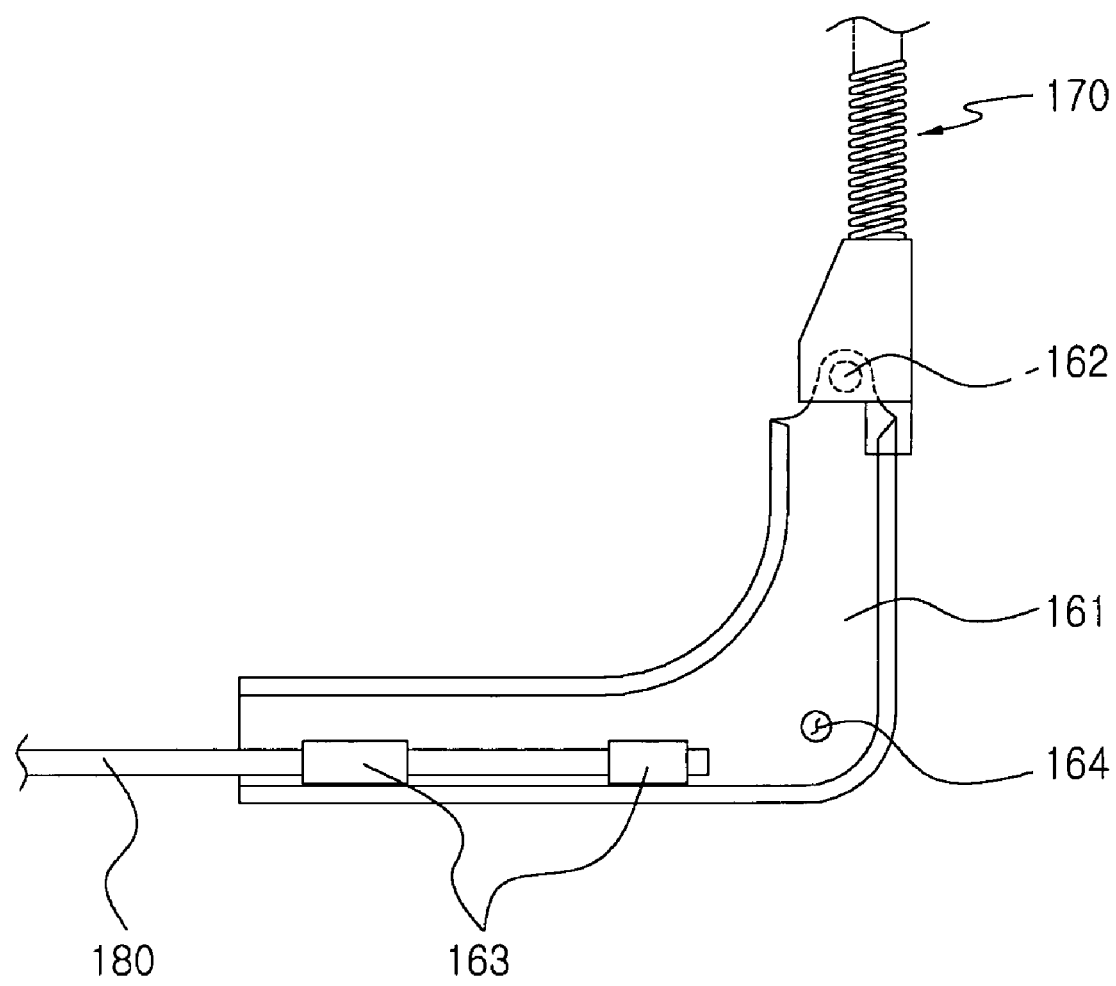
FIG. 8 is a schematic rear perspective view of the rotating link of the side step in FIG. 1.
Figure 9:
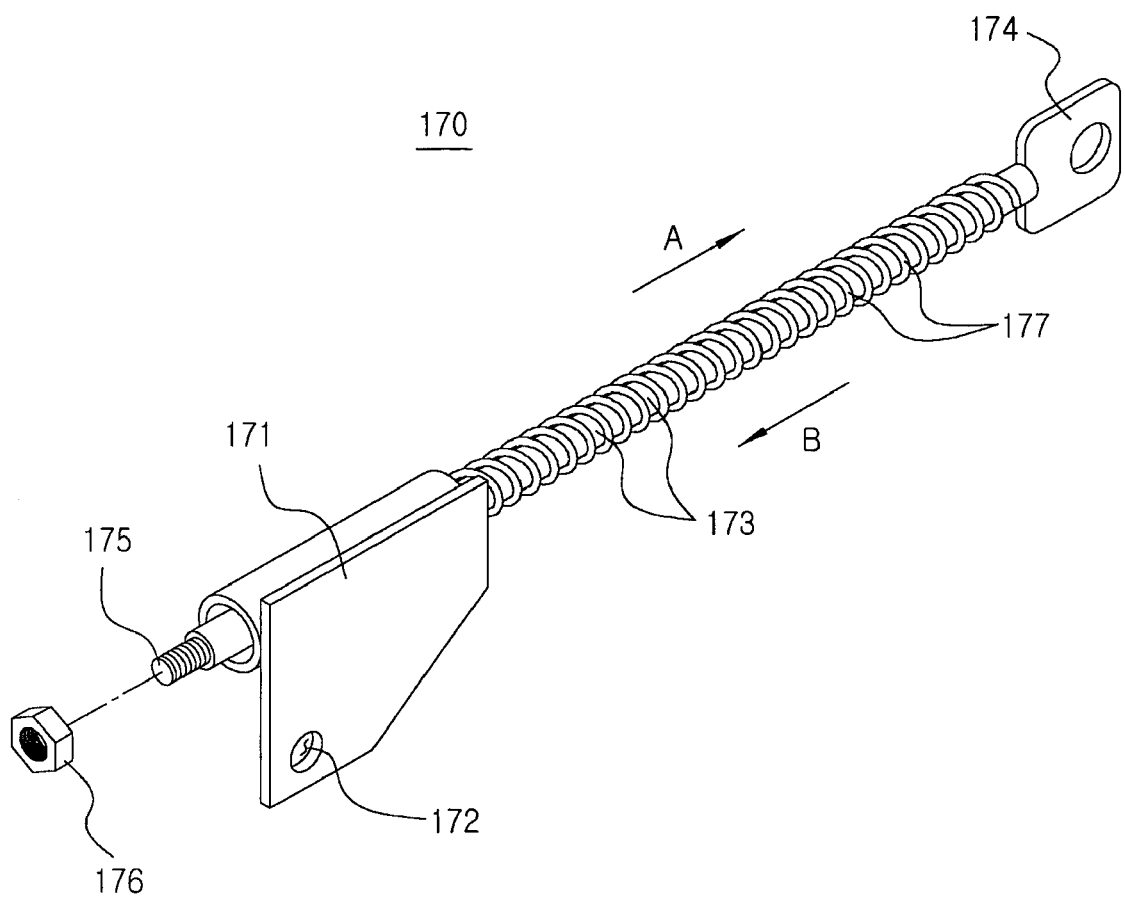
FIG. 9 is a broken perspective view of the operating member of the side step in FIG. 1.

As shown in FIG. 8, the body 161 of the rotating link 160 is a "┐" type. On the bending portion of the body 161 is formed the fixing shaft connecting hole 164 being rotatably connected to the fixing shaft 132 connected to the connecting frame 130 as shown in FIG. 1.

The operating member connecting hole 162 is formed on the end of the body 161, and the operating member 170 is rotatably connected to the connecting hole 162.

A plurality of through type projection 163 are formed on the other end of the body 161, and the door connecting rod 180 is fixedly connected to the through type projection 163.

Next, the operating member 170 will be explained in detail referring to FIG. 9.

The operating member 170 includes the operating rod bracket 171 being connected to the rotating link 160, the operating rod 173 being connected to the foothold 150, the coil spring 177 covering the operating rod 173 and the nut 176 being connected to the end of the operating rod 173.

The operating rod bracket 171 is formed with the rotating link connecting hole 172 thereon, thereby it is rotatably connected to the rotating link 160. Further, the operating rod 173 may pass through the operating rod bracket 171.

The operating rod 173 is a long bar, and it is provided with the bolt portion 175 on one end thereof and provided with the foothold connecting portion 174 being connected to the foothold 150 on the other end thereof.

The outer surface of the operating rod 173 is covered with the coil spring 177 having a smaller length than the operating rod 173.

In the above-described structure of the operating member 170, the operating rod 173 is inserted into the coil spring 177. Afterwards, the bolt portion 175 of the operating rod 173 is inserted into the operating rod bracket 171. Afterwards, the bolt portion 175 is fastened by means of a fastening member such as the nut 176. In this structure, if an outer force is applied to the operating rod 173 in the B direction, the operating rod 173 is moved in the same direction and then the coil spring 177 is compressed. Accordingly, under the opening of the door of the vehicle, when an outer force is applied to the foothold 150 in the B direction, only the foothold 150 may be moved toward the body frame of the lower portion of the vehicle.

The operation of the movable side step for a vehicle of the present invention having the above-described structure will be explained referring to FIGS. 10 and 11.

Figure 10:
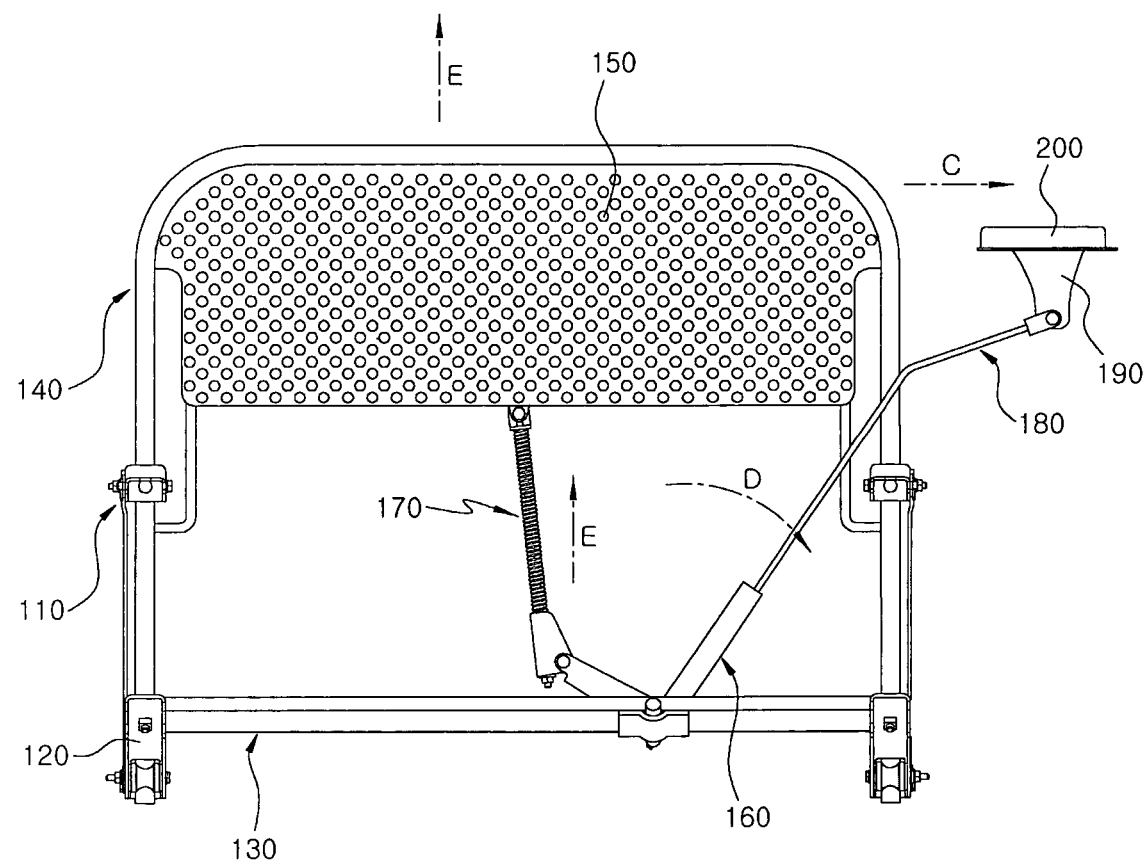
FIG. 10 is a schematic view showing a state of the side step in FIG. 1 when the door of the vehicle is opened.

Like FIG. 10, if the door 200 is moved in the C direction, the door connecting rod 180 and the rotating link 160 are rotated in the D direction. At this time, the operating member 170 is moved in the E direction, and then the foothold 150 is moved in the same direction. Thereby, when the door 200 of the vehicle is opened, the foothold is protruded in front of the door 200.

Figure 11:
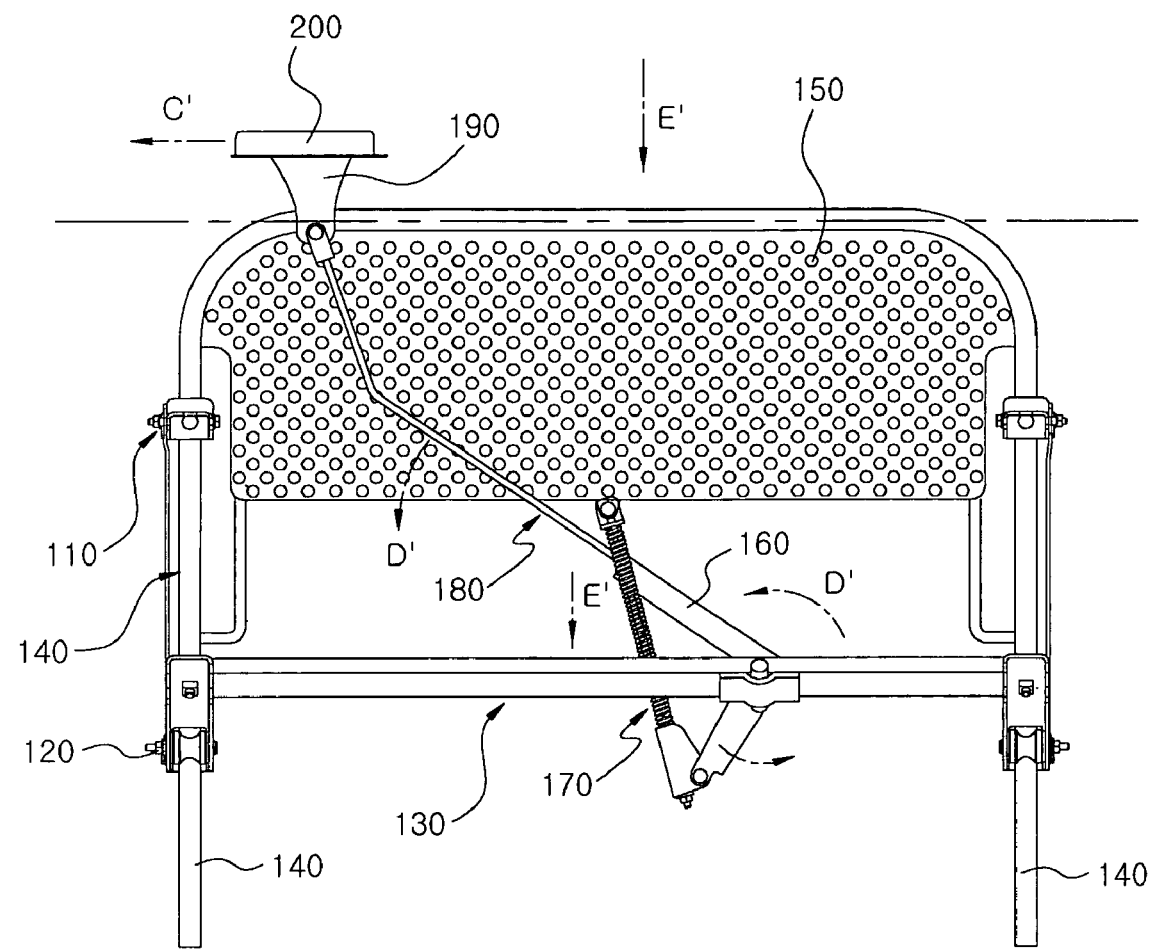
FIG. 11 is a schematic view showing a state of the side step in FIG. 1 when the door of the vehicle is shut.
Figure 12:
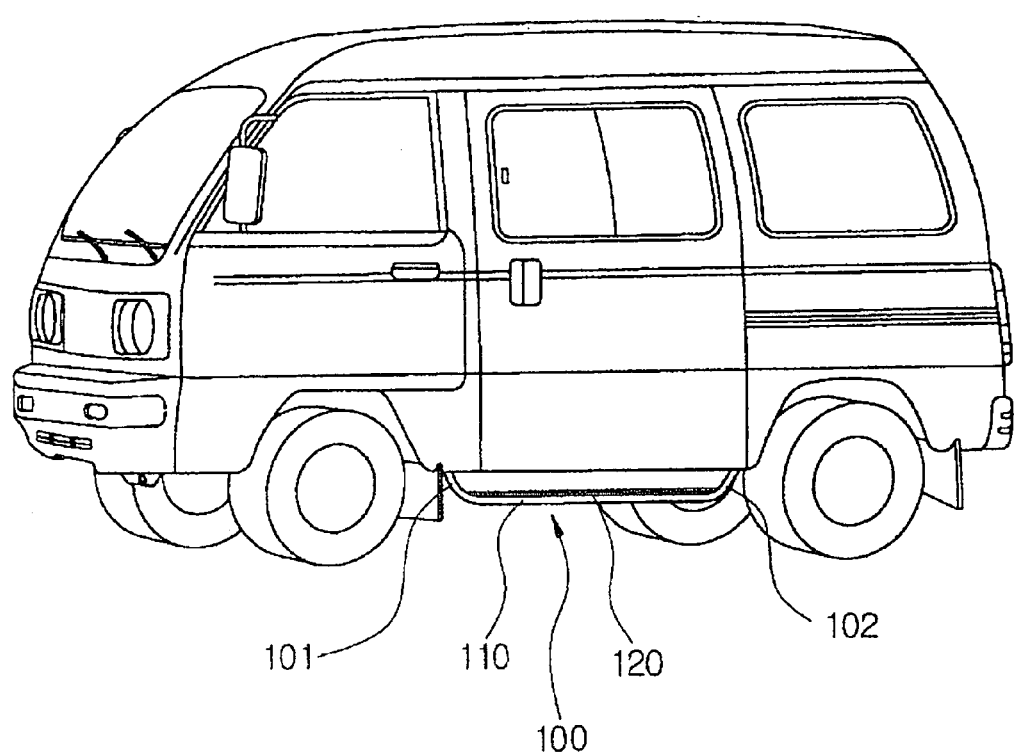
FIG. 12 is an overall perspective view of the vehicle on which the conventional side step is mounted.

Further, like FIG. 11, if the door 200 is moved in the C' direction, the door connecting rod 180 and the rotating link 160 are rotated in the D' direction. At this time, the operating member 170 is moved in the E' direction. And then the foothold 150 is moved in the same direction. Therefore, when the door 200 of the vehicle is shut, the foothold 150 is entered into the lower portion of the vehicle.

According to the movable side step for a vehicle, since the movable side step is not protruded during driving, the vehicle may be driven more safely. Further, when the vehicle is parked, it does not require wide a parking space.

Further, since the movable side step is protruded according to the opening of the door, children or the old and the weak may get in or get out of the vehicle safely.

While the present invention has been particularly shown and described with reference to a particular embodiment thereof, it will be understood by those skilled in the art that various changes in form and detail may be effected therein without departing from the spirit and scope of the invention as defined by the appended claims.

The invention claimed is:

1. A movable side step for a vehicle comprising:
   a fixing means being connected to a body frame of the lower portion of the vehicle, said fixing means including a front frame and a rear frame which are arranged with a predetermined distance;
   a stepping means being connected movably forward and backward to said fixing means; and
   an operating means for operating said stepping means according to the opening/shutting of a door of said vehicle,
   wherein each of said front frame and said rear frame has an upper roller and a lower roller in order to help the movement of said stepping means, the front frame having an elastic member on the outside of the upper portion of the upper roller thereof and the rear frame having an elastic member on the lower portion of the lower roller thereof in order to relieve an outer force being applied to said stepping means.

2. The movable side step as claimed in claim 1, said stepping means comprises a guide bar being interposed between said upper roller and lower roller of said front frame and rear frame, and a foothold being connected to the front of said guide bar.

3. The movable side step as claimed in claim 1, said operating means comprises a rotating link being rotatably connected to said fixing means, a door connecting rod being fixedly connected to one end of said rotating link, and an operating member being rotatably connected to the other end of said rotating link and connecting to said stepping means.

4. The movable side step as claimed in claim 3, said operating member comprises an operating rod being fixedly connected to said stepping means, an operating rod bracket being rotatably connected to said rotating link and being movably connected to said operating rod, and an elastic member covering said operating rod and being blocked to be moved by said operating rod bracket.

5. The movable side step as claimed in claim 3, said operating means further comprises a door connecting bracket being fixedly connected to said door and being rotatably connected to said door connecting rod.

6. A movable side step for a vehicle comprising:
   a fixing frame being connected to a body frame of the lower portion of the vehicle, said fixing frame including a front frame and a rear frame, in which the front frame and the rear frame are fixedly connected to each other by a supporting member;
   a connecting frame for fixedly connecting said fixing frame;
   a guide bar being connected movably forward and backward to said fixing frame;
   a foothold being connected to the front of said guide bar;
   a rotating link roratably connected to the intermediate of said connecting frame with a predetermined distance;
   an operating member having one end being rotatably connected to one end of said rotating link and the other end being connected to said foothold;
   a door connecting rod being fixedly connected to the other end of said rotating link; and
   a door connecting bracket being rotatably connected to said door connecting rod and being fixedly connected to a door of said vehicle,
   wherein each of said front frame and said rear frame has an upper roller and a lower roller in order to help the movement of said guide bar, the front frame having an elastic member on the outside of the upper portion of the upper roller thereof and the rear frame having an elastic member on outside of the lower portion of the lower roller thereof in order to relieve an outer force being applied to said guide bar and said foothold.

7. The movable side step as claimed in claim 6, said operating member comprises an operating rod being fixedly connected to said foothold, an operating rod bracket being rotatably connected to said rotating link and being movably connected to said operating rod, and an elastic member covering said operating rod and being blocked to be moved by said operating rod bracket.

8. A movable side step for a vehicle comprising:
   two front frames and two rear frames being connected to a body frame of the lower portion of the vehicle;
   a supporting member for fixedly connecting said front frame and said rear frame;
   a connecting frame for fixedly connecting two rear frames to each other;

a guide bar being connected movably forward and backward to said front frame and rear frame;

a foothold being connected to the front of said guide bar;

an upper roller and a lower roller being installed on said front frame and rear frame to contact the upper and lower portion of said guide bar in order to help the moving of said guide bar;

an elastic member being installed on the upper portion of said upper roller of said front frame and the lower portion of said lower roller of said rear frame in order to relieve the outer force being applied to said guide bar and said foothold;

a rotating link being rotatably connected to the intermediate of said connecting frame with a predetermined distance;

an operating rod being fixedly connected to said foothold;

an operating rod bracket being rotatably connected to one end of said rotating link and being movably connected to said operating rod;

an elastic member covering said operating rod and being blocked to be moved by said operating rod bracket;

a door connecting rod being fixedly connected to the other end of said rotating link; and a door connecting bracket being rotatably connected to said door connecting rod and being fixedly connected to a door of said vehicle.

* * * * *